Feb. 26, 1963   F. SCHÄFER ETAL   3,079,520
COMMUTATOR AND PROCESS AND APPARATUS FOR MANUFACTURING THE SAME
Filed March 30, 1960   2 Sheets-Sheet 1

INVENTORS
Fridolin Schäfer
Karl Wink
BY Michael S. Striker
attorney

United States Patent Office 3,079,520
Patented Feb. 26, 1963

3,079,520
COMMUTATOR AND PROCESS AND APPARATUS
FOR MANUFACTURING THE SAME
Fridolin Schäfer, Stuttgart, and Karl Wick, Stuttgart-Rohr,
Germany, assignors to Robert Bosch G.m.b.H., Stuttgart, Germany
Filed Mar. 30, 1960, Ser. No. 18,547
Claims priority, application Germany Apr. 3, 1959
29 Claims. (Cl. 310—235)

The present invention relates to commutators.

More particularly, the present invention relates to commutators for electrical motors as well as a process and apparatus used in the manufacture of the commutators.

One of the objects of the present invention is to render it possible to assemble quickly and efficiently a relatively large number of commutator segments preparatory to locating a plastic material between these segments.

Another object of the present invention is to render it possible to assemble the segments quickly and easily as well as to guarantee that the segments are properly positioned with respect to each other both axially and circumferentially.

A further object of the present invention is to provide a structure which will enable an assembly of commutator segments to be introduced as an assembly into a mold in which the plastic material of the commutator is molded in a manner embedding the segments in the plastic material.

An additional object of the present invention is to provide a process and apparatus which makes it possible to assemble outside of a mold the segments of a commutator in proper relation with respect to each other while the molding of a plastic body with respect to a previously assembled set of segments is proceeding, so that with the invention it is possible to have quite a large output in a minimum of time.

With the above objects in view the invention includes a commutator, a plurality of commutator segments which are distributed uniformly about and extend parallel to an axis which is radially equidistant from these segments. Each of these segments is formed at at least one end with a longitudinal notch, and these notches are located along a circle whose center is in the above-mentioned axis. A ring of electrically non-conductive material surrounds this latter axis, is located in the notches, and is formed in at least one of its peripheral surfaces with a plurality of axial grooves which respectively receive portions of the segments so as to determine the circumferential spacing therebetween.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
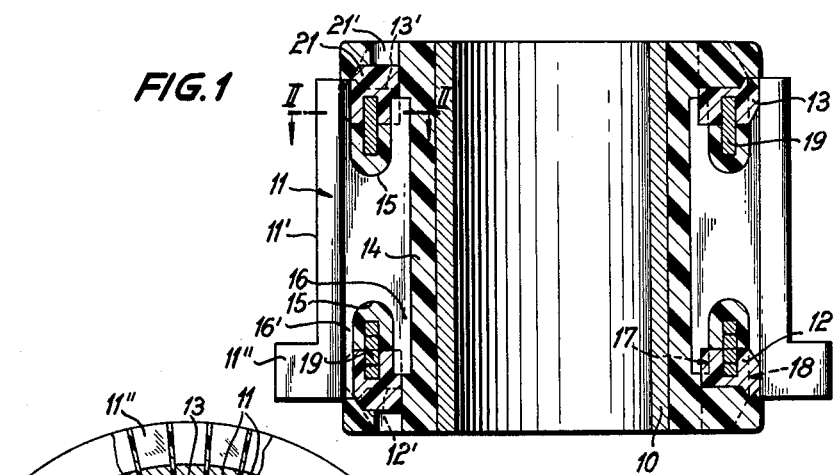
FIG. 1 shows, in an axial section view, one possible embodiment of a commutator constructed according to the present invention.
Figure 2:
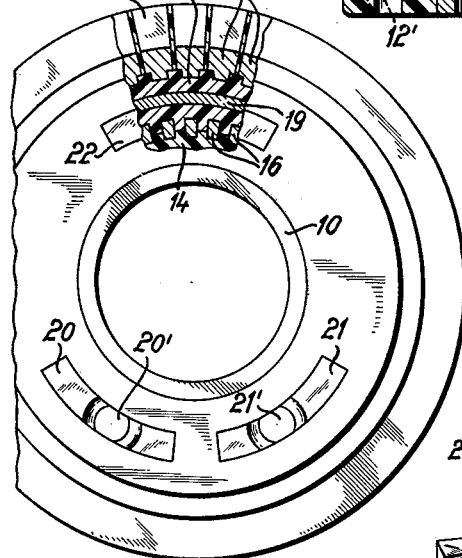
FIG. 2 is a fragmentary top plan view of a commutator having the construction of that shown in FIG. 1 with part of the commutator shown in FIG. 2 in a sectional plane taken along line II—II of FIG. 1 in the direction of the arrows.

Referring now to FIGS. 1 and 2, the commutator illustrated therein includes an inner sleeve 10 which is adapted to be fixed to the shaft of the motor in a well known manner. The commutator structure carried by this sleeve 10 includes a plurality of copper commutator segments 11. There may be, for example, 49 such segments uniformly distributed about the axis of the sleeve 10 extending parallel thereto with all of the segments radially equidistant from this axis. In addition to the commutator segments 11, the commutator includes a pair of segment-holding rings 12 and 13, and these rings as well as the segments are embedded in and supported by a body 14 of electrically non-conductive plastic material such as, for example, a hardened, molded asbestos-containing phenolic resin.

The rings 12 and 13 are identical. Each of these rings is formed at its inner peripheral surface with a plurality of axial grooves 17 which form between themselves the ribs 17', and each of the rings 12 and 13 is formed at its outer peripheral surface with a plurality of axial grooves 18 which define between themselves the ribs 18'. Each of the commutator segments 11 is formed at its ends with a pair of longitudinal notches 15, respectively, so that the notches 15 are arranged along a pair of coaxial circles whose centers are in the axis of the commutator, and the rings 12 and 13 extend respectively along these circles through the notches 15, portions of the segments 11 being respectively received in the grooves 18 and other portions of the segments 11 being respectively received in the grooves 17 so that these grooves determine the circumferential spacing of the segments 11. The radial thickness of the portions of the rings 12 and 13 which are respectively located in the notches 15 is equal to the radial width of these notches. Thus, rings 12 and 13 serve to assemble the segments 11 in proper positions relative to each other prior to molding of the body 14 in which the segments and the rings are embedded. Each of the rings 12 and 13 is made of an electrically non-conductive material, preferably a hardened plastic having an inorganic filler. A reinforcing ring 19 may be embedded partly in each of the rings 12 and 13, although in the particular example illustrated in FIG. 1 such a ring 19 is shown only at the upper plastic ring 13, and the ring 19 extends beyond the plastic ring 13 in which it is embedded further into the notch 15 without however engaging any of the commutator segments 11. The reinforcing ring 19 is preferably made of a hardenable steel having a low coefficient of expansion. Instead of a simple smooth steel ring, the reinforcing ring may be formed by several convolutions of hardened steel wire of, for example, rectangular cross section, with the convolutions thereof fused to each other by soldering or welding, as shown in the lower part of FIG. 1.

Figure 3:
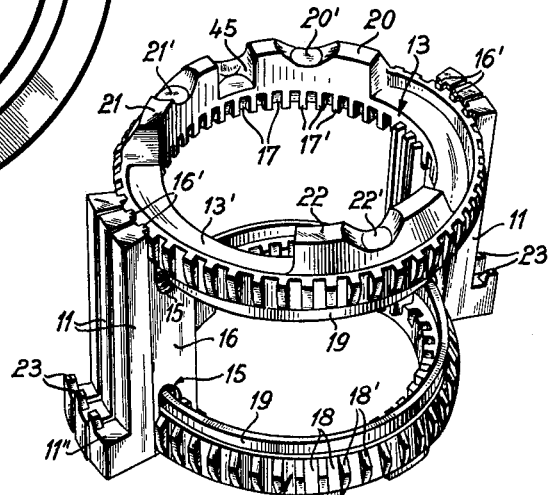
FIG. 3 is a perspective illustration of a pair of holding rings which hold the commutator segments in proper position with respect to each other, some of these commutator segments being also illustrated in FIG. 3.

As apparent from FIGS. 1–3 each of the commutator segments 11 includes a base portion 16 of reduced thickness providing each segment 11 at its opposite side faces with a pair of longitudinal shoulders, respectively, directed toward the axis of the commutator. Each of the ribs 18' has a radial thickness equal to the distance between each notch 15 and the longitudinal shoulders of each segment which are directed toward the axis of the commutator, so that when the commutator segments are assembled with the rings 12 and 13, the ribs 18 will extend up to and engage the longitudinal shoulders of the segments so as to reinforce the body 14 in the region 16' (FIGS. 1 and 3).

As is apparent from FIGS. 1 and 3 the grooves 17 at the inner peripheral surface of each ring 12 and 13 extend only part of the way along each ring so as to terminate in a shoulder at one end of each groove 17, and the ends of segments 11 respectively engage these shoulders so as to determine the axial distance between the rings 12 and 13.

Furthermore, in order to facilitate the assembly of the segments 11 with the rings 12 and 13, the ribs 18' have a maximum width at a location spaced from the end of each ring 12 and 13 which is directed toward the interior of the notches 15 which receives the ring, and the width of each rib 18' gradually diminishes toward this end of the ring 12 or 13 so that the ribs 18' are inclined as clearly shown in FIGS. 1 and 3.

Each of the rings 12 and 13 has an end face directed away from the segments 11, and at this end face each ring is provided in the illustrated example with three projections 20, 21 and 22 adapted to engage part of the mold when the assembly of segments and rings is introduced into the mold. Each of the projections 20, 21, and 22 is formed with a cutout 20', 21', and 22' adapted to receive a locating boss in the floor or cover of the mold. In order to facilitate entry of these bosses into the recesses 20', 21', and 22' the bosses have, for example, a frustoconical configuration and the recesses have a mating configuration. It will be noted that the projections 20—22 are circumferentially spaced from each other (FIG. 3) and, as is apparent from FIG. 1, the body 14 extends into the spaces between the projections 20—22 of each ring 12 and 13.

As is shown in FIG. 3, each commutator segment 11 has at one end a soldering lug 11'' which serves in a known way as a projection by which an electrical connection is made with the armature coils. Each of the soldering lugs or projections 11'' has an extension 23 extending toward the end of the segment opposed to that which has the soldering lug, and each extension 23 is of a wedge-shaped configuration. When the assembly shown in FIG. 3 is introduced into the mold the extensions 23 will enter molding depressions in the mold so as to guarantee the circumferential and radial positioning of the segments in the mold during the molding of the body 14.

Figure 6:
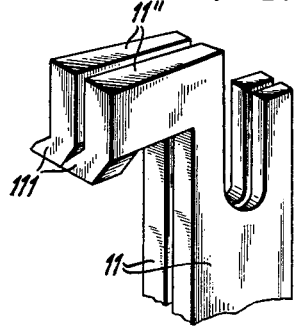
FIG. 6 is a fragmentary perspective illustration of a pair of adjoining commutator segments.

It is also possible to accomplish this result by providing the soldering lugs 11'' with extension 111 (FIG. 6). Each of the extensions 111 extends from the soldering lug of one segment toward and into engagement with the extension 111 of the adjoining segment so that in this way the extensions 111 engage each other to guarantee the circumferential spacing of the segments. After the commutator is removed from the mold the extensions 23 of FIG. 3, or the extension 111 in the case of FIG. 6, are machined off, so that these extensions do not form part of the finished commutator.

In accordance with the present invention an auxiliary core is provided outside of the mold to receive the assembly shown in FIG. 3 prior to insertion thereof into the mold, so that in this way it becomes possible to assemble the segments 11 and the rings 12 and 13 outside of the mold while the molding itself goes forward and thus a high output is guaranteed. The assembly shown in FIG. 3 (with all of the segments 11) can be locked on the auxiliary core, inserted into the mold, and then unlocked from the auxiliary core which may be removed leaving the rings 12 and 13 and the segments 11 in the mold which is then closed in a conventional manner so that the molding of the body can proceed while the next set of segments 11 and rings 12 and 13 are assembled on the auxiliary core. Thus, it is possible to assemble on a number of auxiliary cores a plurality of assemblies of FIG. 3 which are thus ready to be introduced into a mold as soon as the body 14 together with the segments 11 and rings 12 and 13 embedded therein are removed from the mold, so that not only is there an uninterrupted use of the mold, but in addition the segments 11 are assembled with respect to each other at a location where they are not influenced by the high temperature of the mold so as to facilitate molding operations.

Figure 4:
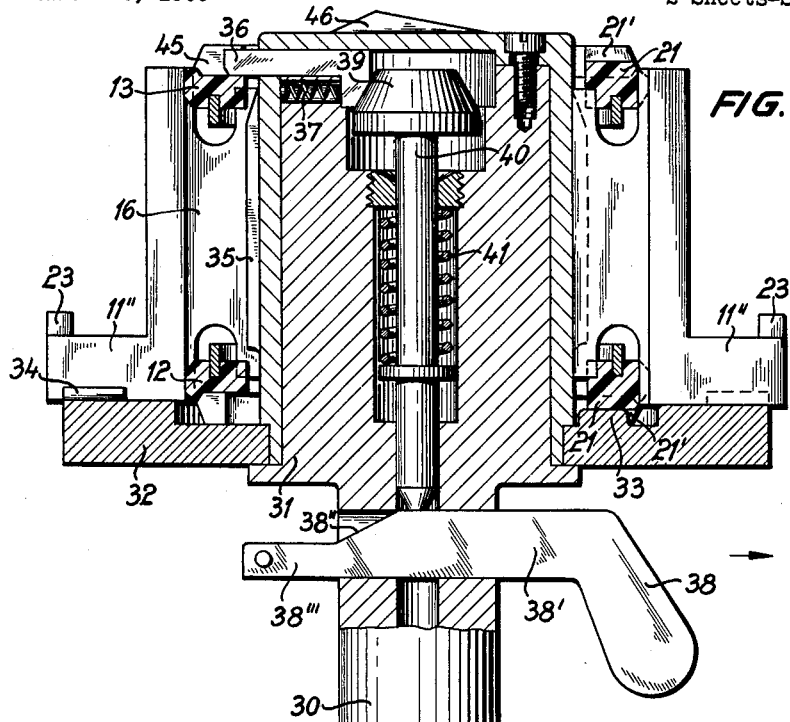
FIG. 4 is an elevation, partly in axial section, of an auxiliary core on which the segments and holding rings therefor are assembled prior to being placed in a mold.
Figure 5:
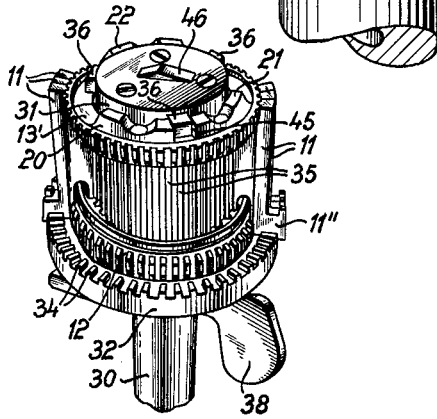
FIG. 5 is a perspective illustration of the structure of FIG. 4 with several of the commutator segments not shown so as to clearly illustrate the structure which cooperates with these segments.

One possible embodiment of an auxiliary core according to the present invention is illustrated in FIGS. 4 and 5. The auxiliary core is made of a relatively light material such as, for example, aluminum or a plastic such as a polyamide similar to nylon, and the auxiliary core includes an elongated body portion 31 which at one end carries an outwardly directed annular flange 32. The body 31 is connected to an elongated shaft 30 which is coaxial with and preferably integral with the auxiliary core body 31. The flange 32 is annularly stepped so that it has an inner peripheral portion whose thickness is less than its outer peripheral portion, and this inner peripheral portion is provided with three angularly spaced bosses 33 which respectively mate with and are received in the recesses 20', 21', 22' formed in the projections 20—22, respectively, of the ring 12, so that the ring 12 has with respect to the flange 32 the position illustrated in FIG. 4. Identical bosses are located in the mold to be received in these recesses.

Adjacent to its outer periphery the flange 32 is formed at its upper face, as viewed in FIG. 4, with a plurality of radial grooves which define between themselves the ribs 34 which respectively extend into the spaces between the soldering lugs 11'' so as to participate in the circumferential positioning of these lugs. Also, the body 31 is formed with a plurality of longitudinal grooves 35 which respectively receive the base portions 16 so as to participate in this way also in the circumferential positioning of the segments 11. In the use of the structure of FIG. 4, the ring 12 is first placed on the flange 32, then the several segments 11 are assembled with the ring 12 and the auxiliary core, and finally the ring 13 is placed in the position indicated in FIG. 4. It will be noted that the grooves 35 extend along that region of the auxiliary core which is located between the rings 12 and 13.

When the segments 11 and the rings 12 and 13 are thus assembled on the auxiliary core, a locking device is actuated by the operator to lock the assembly of segments and rings on the auxiliary core. This locking means includes in the illustrated example three locking members 36 which respectively extend through three openings formed in the core body 31 adjacent its upper end, as illustrated in FIG. 4, and extending radially with respect to the axis of the core body 31, these locking members 36 and the openings in which they slide preferably being angularly spaced from each other at an angle of 120°. The hollow interior of the core body which receives the locking member 36 also receives springs 37 which cooperate with the inner ends of the locking members 36 in the manner shown in FIG. 4 for urging the locking members 36 to their unlocked position where they are located closely adjacent to the axis of the core body 31. It will be noted that the recess 45 between the projections 20 and 21 of the ring 13 receives one of the locking members 36, so that in this way the angular position of the assembly on the auxiliary core is determined.

The locking means further includes a frustoconical head member 39 located at one end of a plunger 40 which is guided for movement in an axial bore of the core body 31. The inner ends of the lock members 36 have inclined faces cooperating with the frustoconical surface of the head member 39. Within the bore of the body 31 is located a coil spring 41 which bears at one end against a threaded plug formed with a central bore through which the plunger 40 slidably passes and at an opposite end against a collar fixed to the plunger 40, as shown in FIG. 4, so that the spring 41 urges the plunger 40 and the head 39 fixed thereto to a retracted position below that shown in FIG. 4 where the springs 37 can expand in order to retract the locking members 36 and thus unlock the assembly of segments 11 and rings 12 and 13. The shaft 30 is formed adjacent to the core body 31 with a transverse opening extending through the shaft 30 and slidably guiding a manually-engageable lock-actuating member 38 having a relatively wide portion 38', a relatively narrow portion 38''', and an intermediate portion 38'' therebetween. When the member 38 is moved by the operator in the direction of the arrow shown in FIG. 4, which is to say to the right, as viewed in FIG. 4, the free end of the plunger 40 will first engage the inclined surface of the intermediate portion 38'' so that the spring 41 can expand in order to retract the head 39, and when the plunger 40 has engaged the narrow portion 38''' of element 38 the spring 41 will be fully expanded with the head 39 in its retracted position, and of course the springs 37 will have retracted the lock members 36 to release the assembly which is located on the auxiliary core. On the other hand, when the operator shifts the element 38 to the left, as viewed in FIG. 4, the head 39 will rise so as to move the lock members 36 outwardly to their locking position illustrated in FIGS. 4 and 5.

When the assembly of segments 11 and rings 12 and 13 has been locked on the auxiliary core in the manner described above, this assembly is introduced with the auxiliary core into the mold from the top thereof, and the assembly is fixed in the mold in the proper position to have the plastic material which forms the body 14 molded in the form of a body which surrounds the axis of the commutator. In order to guarantee proper location of the assembly in the mold, the core body 31 carries at its upper end, as viewed in FIG. 4, which extends beyond the assembly of rings and segments, a projection 46 which is eccentrically positioned with respect to the center of the end face of the body 31, and this projection 46 is received in a mating recess in the floor of the mold, so that in this way proper angular positioning of the components is guaranteed. When the assembly is introduced together with the auxiliary core into the mold, the bosses of the mold which mate with the recesses 20'—22' of the ring 13 are respectively received in these recesses. With the assembly thus located in the mold the element 38 is moved in the direction of the arrow of FIG. 4 so as to unlock the lock means, and thus the lock members 36 will be retracted by the springs 37, respectively, into the auxiliary core body 31 which now can be slipped out of the assembly of segments and rings, this latter assembly remaining in the mold. Now the mold can be closed with a cover which has a configuration mating with that of the end face of the ring 12, which is to say the cover engages the ends of the projections 20—22 of the ring 12 and has bosses which enter into and mate with the recesses 20'—22' of the ring 12, and now the molding of the body 14 can proceed while the auxiliary core is immediately available to have another assembly of segments and rings mounted thereon in the manner described above.

It will be understood that each of the elements described above, or two or more together, may also find a useful application in other types of commutators differing from the types described above.

While the invention has been illustrated and described as embodied in commutators and process and apparatus for manufacturing the same, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a commutator, in combination, a plurality of commutator segments distributed uniformly about and extending parallel to an axis which is radially equidistant from said segments; an annular body of plastic coaxially surrounding said axis and extending into the spaces between said segments to support the latter and to insulate the same electrically from each other; and an electrically non-conductive ring embedded coaxially in said body and having an annular peripheral surface formed with a plurality of axial grooves into which said segments respectively extend so that said ring determines the spacing of the segments from each other.

2. In a commutator, in combination, a plurality of commutator segments distributed uniformly about and extending parallel to an axis which is radially equidistant from said segments; an annular body of plastic coaxially surrounding said axis and extending into the spaces between said segments to support the latter and to insulate the same electrically from each other; and an electrically non-conductive ring embedded coaxially in said body and having an annular peripheral surface formed with a plurality of axial grooves into which said segments respectively extend so that said ring determines the spacing of the segments from each other, said ring having an end face formed with at least one depression for receiving a boss in a mold for aligning the ring and segments preparatory to forming of the plastic body in the mold.

3. In a commutator, in combination, a plurality of commutator segments distributed uniformly about and extending parallel to an axis which is radially equidistant from said segments, each segment being formed at at least one end with a longitudinal notch and said notches being located along a circle whose center is in said axis; and a ring of electrically non-conductive material surrounding said axis, located in said notches and formed in at least one peripheral surface with a plurality of axial grooves respectively receiving portions of said segments so as to determine the circumferential spacing therebetween.

4. In a commutator, in combination, a plurality of commutator segments distributed uniformly about and extending parallel to an axis which is radially equidistant from said segments, each segment having a pair of opposed end portions respectively formed with a pair of longitudinal notches, said notches being arranged along a pair of coaxial circles whose centers are in said axis; and a pair of rings respectively extending along said circles through said notches with each ring having at least one peripheral surface formed with a plurality of axial grooves respectively receiving portions of said segments to determine the circumferential spacing therebetween.

5. In a commutator, in combination, a plurality of commutator segments distributed uniformly about and extending parallel to an axis which is radially equidistant from said segments, each segment having a pair of opposed end portions respectively formed with a pair of longitudinal notches, said notches being arranged along a pair of coaxial circles whose centers are in said axis; and a pair of rings respectively extending along said circles through said notches with each ring having inner and outer peripheral surfaces each of which is formed with a plurality of axial grooves respectively receiving portions of said segments so that said rings determine the circumferential spacing therebetween.

6. In a commutator, in combination, a plurality of commutator segments distributed uniformly about and extending parallel to an axis which is radially equidistant from said segments, each segment being formed at at least one end with a longitudinal notch and said notches being located along a circle whose center is in said axis; and a ring of electrically non-conductive material surrounding said axis, located in said notches and formed in at least one peripheral surface with a plurality of axial grooves respectively receiving portions of said segments so as to determine the circumferential spacing therebetween, said grooves extending only partly along said ring and respectively terminating in shoulders respectively engaged by end faces of said segments.

7. In a commutator, in combination, a plurality of commutator segments distributed uniformly about and extending parallel to an axis which is radially equidistant from said segments, each segment being formed at at least one end with a longitudinal notch and said notches being located along a circle whose center is in said axis; and a ring of electrically non-conductive material surrounding said axis, located in said notches and having an inner peripheral surface formed with a plurality of axial grooves respectively receiving portions of said segments so as to determine the circumferential spacing therebetween, said grooves extending only partly along said ring and respectively terminating in shoulders respectively engaged by end faces of said segments.

8. In a commutator, in combination, a plurality of commutator segments distributed uniformly about and extending parallel to an axis which is radially equidistant from said segments, each segment being formed at at least one end with a longitudinal notch and said notches being located along a circle whose center is in said axis; and a ring of electrically non-conductive material surrounding said axis, located in said notches and formed in at least one peripheral surface with a plurality of axial grooves respectively receiving portions of said segments so as to determine the circumferential spacing therebetween, the portions of said ring which are respectively located in said notches having a radial thickness equal to the radial width of said notches, respectively.

9. In a commutator, in combination, a plurality of commutator segments distributed uniformly about and extending parallel to an axis which is radially equidistant from said segments, each segment being formed at at least one end with a longitudinal notch and said notches being located along a circle whose center is in said axis; and a ring of electrically non-conductive material surrounding said axis, located in said notches and having an outer peripheral surface formed with a plurality of axial grooves respectively receiving portions of said segments so as to determine the circumferential spacing therebetween, said ring having between said grooves ribs which overlap said segments and said ring having an end directed toward the ends of the segments opposed to those ends which are formed with the notches which receive said ring, said ribs having a maximum radial width at portions thereof spaced from said end of said ring and having a gradually diminishing width from said portions of maximum width toward said end of said ring.

10. In a commutator, in combination, a plurality of commutator segments distributed uniformly about and extending parallel to an axis which is radially equidistant from said segments, each segment being formed at at least one end with a longitudinal notch and said notches being located along a circle whose center is in said axis, each segment having an outer surface directed away from said axis and having between said outer surface and its notch a longitudinal shoulder directed toward said axis; and a ring of electrically non-conductive material surrounding said axis, located in said notches and having an outer peripheral surface formed with a plurality of coaxial grooves respectively receiving portions of said segments so as to determine the circumferential spacing therebetween, said ring having a plurality of ribs respectively located between said grooves, overlapping said segments, and extending up to and engaging said shoulders thereof.

11. In a commutator as recited in claim 3, said ring being made of plastic.

12. In a commutator as recited in claim 3, said ring being made of a plastic material having an inorganic filler.

13. In a commutator, in combination, a plurality of commutator segments distributed uniformly about and extending parallel to an axis which is radially equidistant from said segments, each segment being formed at at least one end with a longitudinal notch and said notches being located along a circle whose center is in said axis; a ring of electrically non-conductive material surrounding said axis, located in said notches and formed in at least one peripheral surface with a plurality of axial grooves respectively receiving portions of said segments so as to determine the circumferential spacing therebetween; and a reinforcing ring at least partly embedded in said first-mentioned ring coaxially therewith.

14. In a commutator, in combination, a plurality of commutator segments distributed uniformly about and extending parallel to an axis which is radially equidistant from said segments, each segment being formed at at least one end with a longitudinal notch and said notches being located along a circle whose center is in said axis; a ring of electrically non-conductive material surrounding said axis, located in said notches and formed in at least one peripheral surface with a plurality of axial grooves respectively receiving portions of said segments so as to determine the circumferential spacing therebetween; and a reinforcing ring at least partly embedded in said first-mentioned ring coaxially therewith, said reinforcing ring extending beyond said first-mentioned ring into said notches but being spaced from and out of engagement with said segments.

15. In a commutator as recited in claim 14, said reinforcing ring being made of a hardenable steel which has a low coefficient of expansion.

16. In a commutator as recited in claim 14, said reinforcing ring being composed of a plurality of convolutions of hardened steel wire which are fused to each other.

17. In a commutator as recited in claim 16, said wire having a rectangular cross section.

18. In a commutator, in combination, a plurality of commutator segments distributed uniformly about and extending parallel to an axis which is radially equidistant from said segments, each segment being formed at at least one end with a longitudinal notch and said notches being located along a circle whose center is in said axis; and a ring of electrically non-conductive material surrounding said axis, located in said notches and formed in at least one peripheral surface with a plurality of axial grooves respectively receiving portions of said segments so as to determine the circumferential spacing therebetween, said ring having an outer end face directed away from said segments and having a plurality of axial projections which are adapted to engage part of a mold into which the ring and segments are placed preparatory to receiving plastic material between the segments.

19. In a commutator, in combination, a plurality of commutator segments distributed uniformly about and extending parallel to an axis which is radially equidistant from said segments, each segment being formed at at least one end with a longitudinal notch and said notches being located along a circle whose center is in said axis; and a ring of electrically non-conductive material surrounding said axis, located in said notches and formed in at least one peripheral surface with a plurality of axial grooves respectively receiving portions of said segments so as to determine the circumferential spacing therebetween, said ring having an outer end face directed away from said segments and having a plurality of axial projections which are adapted to engage part of a mold into which the ring and segments are placed preparatory to receiving plastic material between the segments, and at least one of said projections being formed with a cutout for receiving a mold projection of the same configuration as said cutout.

20. In a commutator, in combination, a plurality of commutator segments distributed uniformly about and extending parallel to an axis which is radially equidistant from said segments, each segment being formed at at least one end with a longitudinal notch and said notches being located along a circle whose center is in said axis;

and a ring of electrically non-conductive material surrounding said axis, located in said notches and formed in at least one peripheral surface with a plurality of axial grooves respectively receiving portions of said segments so as to determine the circumferential spacing therebetween, said ring having an outer end face directed away from said segments and having a plurality of axial projections which are adapted to engage part of a mold into which the ring and segments are placed preparatory to receiving plastic material between the segments, at least one of said projections being formed with a cutout of frustoconical configuration for receiving a mold projection of corresponding configuration.

21. In a commutator, in combination, a plurality of commutator segments distributed uniformly about and extending parallel to an axis which is radially equidistant from said segments, each segment having a pair of opposed end portions respectively formed with a pair of longitudinal notches, said notches being arranged along a pair of coaxial circles whose centers are in said axis; and a pair of identical rings of electrically non-conductive material respectively extending along said circles through said notches with each ring having at least one peripheral surface formed with a plurality of axial grooves respectively receiving portions of said segments to determine the circumferential spacing therebetween.

22. In a commutator, in combination, a plurality of commutator segments distributed uniformly about and extending parallel to an axis which is radially equidistant from said segments, each segment being formed at at least one end with a longitudinal notch and said notches being located along a circle whose center is in said axis; a ring of electrically non-conductive material surrounding said axis, located in said notches and formed in at least one peripheral surface with a plurality of axial grooves respectively receiving portions of said segments so as to determine the circumferential spacing therebetween, said ring having an outer end face directed away from said segments and having a plurality of axial projections which are adapted to engage part of a mold into which the ring and segments are placed preparatory to receiving plastic material between the segments; and an annular plastic body supporting said segments, located in the spaces therebetween, and having said ring embedded therein, the material of said plastic body extending into the spaces between said projections of said ring.

23. In a process for manufacturing a commutator, the steps of assembling a plurality of commutator segments with a pair of rings which determine the circumferential spacing between said segments and mounting the rings and segments on an auxiliary core while the segments, rings, and auxiliary core are outside of a mold; locking the assembled rings and segments on said core; introducing the rings and segments into a mold; unlocking the core from the rings and segments; and removing the core so that the molding of a plastic body into the spaces between the segments may proceed while the auxiliary core is available to have another set of rings and segments mounted thereon.

24. In an auxiliary core which is adapted to support an assembly of commutator segments and holding rings before they are placed in a mold, in combination, an elongated core body; an annular flange fixed to and extending outwardly away from said body, said flange having an end face adapted to be engaged by ends of the segments and by one of the holding rings therefor, said end face of said flange being formed with a plurality of radial grooves which are adapted to respectively receive the ends of the segments; and at least one boss fixed to said end face and adapted to extend into a mating recess formed in the ring which engages said end face of said flange.

25. In an auxiliary core which is adapted to support an assembly of commutator segments and holding rings before they are placed in a mold, in combination, an elongated core body; an annular flange fixed to and extending outwardly away from said body, said flange having an end face adapted to be engaged by ends of the segments and by one of the holding rings therefor, said end face of said flange being formed with a plurality of radial grooves which are adapted to respectively receive the ends of the segments; and at least one boss fixed to said end face and adapted to extend into a mating recess formed in the ring which engages said end face of said flange, said elongated core body also being formed with a plurality of longitudinal grooves which respectively receive portions of the commutator segments.

26. In an auxiliary core on which commutator segments and holding rings therefor are adapted to be mounted preparatory to being placed in a mold, in combination, an elongated core body having adjacent one end thereof an outwardly directed annular flange which is adapted to be engaged by one of the rings and the ends of the segments at one of the ends thereof, said core body extending beyond said segments and having formed at a portion beyond said segments at least one opening; and manually operable lock means carried by said core body and movable through said opening thereof to and from a position locking the assembly of segments and rings on said core body.

27. In an auxiliary core on which an assembly of commutator segments and holding rings therefor are adapted to be mounted preparatory to be placed in a mold, in combination, an elongated core body having an outwardly directed flange adapted to be engaged by the segments and one of said rings, said body extending from said flange thereof through and beyond said rings and segments and terminating in an end face distant from said flange and directed away therefrom; and a projection located on said end face of said core body and positioned eccentrically with respect to the center thereof, said projection being adapted to be received in a recess of a mold for orienting the assembly of rings and segments in the mold when the assembly is introduced into the latter with said auxiliary core.

28. A commutator segment consisting of an elongated metal member having at one end a radial projection which is adapted to form part of an electrical connection with the commutator segment, and said radial projection itself having an integral projecting portion extending toward the opposite end of the segment and adapted to enter into an opening in a mold for participating in the positioning of the segment in a mold during manufacture of the entire commutator, said projecting portion being adapted to be machined away from the segment after the commutator is removed from the mold.

29. A commutator segment consisting of an elongated metal member having at one end a radial projection adapted to form part of an electrical connection to said segment, said radial projection having an extension extending toward the opposite end of the segment and extending laterally from said projection to engage the projection of a neighboring segment in an assembly of the segments for participating in the circumferential spacing of the segments from each other.

References Cited in the file of this patent

UNITED STATES PATENTS 2,461,986  Kalikow _____ Feb. 15, 1949

FOREIGN PATENTS 648,224  Great Britain _____ Jan. 3, 1951
868,765  Germany _____ Feb. 26, 1953